United States Patent
Almalki

(10) Patent No.: US 9,907,050 B2
(45) Date of Patent: Feb. 27, 2018

(54) SYSTEM AND METHOD FOR MANAGING MOBILE DEVICE ALERTS BASED ON USER ACTIVITY

(71) Applicant: Arqaam Incorporated, Waterloo (CA)

(72) Inventor: Nazih Almalki, Waterloo (CA)

(73) Assignee: Arqaam Incorporated, Waterloo (CA)

( * ) Notice: Subject to any disclaimer, the term of this patent is extended or adjusted under 35 U.S.C. 154(b) by 0 days.

(21) Appl. No.: 15/210,279

(22) Filed: Jul. 14, 2016

(65) Prior Publication Data

US 2018/0020424 A1   Jan. 18, 2018

(51) Int. Cl.
| | |
|---|---|
| *H04W 68/02* | (2009.01) |
| *H04B 1/3827* | (2015.01) |
| *H04W 4/22* | (2009.01) |
| *H04M 3/42* | (2006.01) |
| *H04W 84/18* | (2009.01) |

(52) U.S. Cl.
CPC ............ *H04W 68/02* (2013.01); *H04B 1/385* (2013.01); *H04M 3/42059* (2013.01); *H04W 4/22* (2013.01); *H04W 84/18* (2013.01)

(58) Field of Classification Search
CPC ....... H04W 68/02; H04W 4/22; H04W 84/18; H04M 3/42059; H04B 1/385
See application file for complete search history.

(56) References Cited

U.S. PATENT DOCUMENTS

| | | | |
|---|---|---|---|
| 2015/0269827 A1* | 9/2015 | Hopkins | ................. H04W 4/22 340/539.12 |
| 2017/0099385 A1* | 4/2017 | Nguyen | ............ H04M 3/42195 |

* cited by examiner

*Primary Examiner* — Chuong A Ngo
(74) *Attorney, Agent, or Firm* — Bereskin & Parr LLP

(57) ABSTRACT

A system and method for managing alerts of a mobile communications device is provided. The system includes the device, a processor, and a sensor for monitoring activity of a user and generating sensor data indicative of the activity. The processor is configured for processing the sensor data to determine a current activity of the user; detecting an alert corresponding to an incoming communication; classifying the alert as being immediate or deferred based at least in part on the current activity. If the alert is immediate, the processor is configured to announce the alert without delay; otherwise, the processor is configured to announce the alert after a delay. The delay can terminate when a holdback timer expires or the current activity changes to an activity that indicates that the user can be notified.

22 Claims, 7 Drawing Sheets

SYSTEM AND METHOD FOR MANAGING MOBILE DEVICE ALERTS BASED ON USER ACTIVITY

FIELD

The embodiments described herein relate to mobile communications devices and in particular, providing alerts for incoming communication on the mobile communications device.

BACKGROUND

Mobile communications devices receive incoming communications and transmit outgoing communications such as calls, text messages, and multi-media messages. The functionality of mobile communications devices has increased significantly as well. Many mobile communications devices include a GPS receiver and sensors, from which data may be obtained and used for various applications operating on the mobile communications device.

Traditionally, alerts for incoming communication on a mobile communications device are provided at the time of arrival, provided that the mobile communications device is connected to the wireless network. The timing of the alert does not take into account the circumstances of the mobile communications device. Circumstances may relate to an activity that a user of the mobile communications device is engaged in. However, in some circumstances it may be undesirable to provide the alert at the time of arrival. For example, the user may be driving, the alert may distract the user, and it may be more desirable to alert the user when the user is no longer driving. In another example, the user may be in a deep sleep cycle and the alert may disruption the user's deep sleep cycle, which reduces alertness and productivity the following day. In some cases, it may be more desirable to alert the user after the deep sleep cycle has completed.

Recently, wearable devices have become more prevalent. Wearable devices can also include sensors that monitor a user wearing the wearable device. Whether located within a mobile communications device or a wearable device, sensors are generally used to monitor the activity of a user of the mobile communications device or wearable device respectively. Monitoring a user's activity can provide the circumstances for the device.

SUMMARY

In accordance with an embodiment, there is provided a method for managing alerts of a mobile communications device. The method can involve using a sensor to monitor activity of a user of the mobile communications device and generate sensor data indicative of the activity; processing the sensor data to determine a current activity of the user; detecting an alert corresponding to an incoming communication from a wireless network to the mobile communications device; and classifying the alert as being immediate or deferred based at least in part on the current activity. If the alert is immediate, the method can further involve announcing the alert without delay. Otherwise, the method can further involve announcing the alert after a delay. The delay can terminate when at least one of a holdback timer expires and the current activity changes to an activity that indicates that the user can be notified.

In some embodiments, the announcing the alert after a delay involves determining whether the holdback timer is in progress and if the holdback timer is not in progress, initializing the holdback timer based upon the current activity. Announcing the alert after a delay can further involve storing, in memory, the alert as a pending alert with a corresponding announcement indicator indicating that the alert has not been announced; detecting that the delay has terminated; and announcing one or more pending alerts stored in the memory.

In some embodiments, the storing the alert as a pending alert can further involve providing notice that the incoming communication is being managed.

In some embodiments, the classifying the alert as being immediate or deferred based at least in part on the current activity involves classifying the alert as being immediate if the current activity indicates that the user can be notified; otherwise, classifying the alert as being deferred.

In some embodiments, the classifying the alert as being immediate or deferred based at least in part on the current activity further involves determining a type of communication for the incoming communication. The type of communication for the incoming communication can be voice-based communication and/or text-based communication.

In some embodiments, the classifying the alert as being immediate or deferred based at least in part on the current activity can involve determining whether the incoming communication is urgent or not urgent; classifying the alert as being immediate if the incoming communication is urgent and irrespective of the current activity, and classifying the alert as being immediate if the incoming communication is not urgent and the current activity indicates that the user can be notified; otherwise, classifying the alert as being deferred.

In some embodiments, the determining whether the incoming communication is urgent or not urgent can involve detecting an urgent indicator corresponding to the alert.

In some embodiments, the determining whether the incoming communication is urgent or not urgent can involve determining an originating phone number from which the incoming communication originates.

In accordance with another embodiment, there is provided a system for managing alerts of a mobile communications device. The system can include a mobile communications device; a sensor for monitoring activity of a user of the mobile communications device and generating sensor data indicative of the activity, and a processor. The mobile communications device can include a wireless communication subsystem for communicating over a wireless network. The processor can be configured for processing the sensor data to determine a current activity of the user; detecting an alert corresponding to an incoming communication from a wireless network to the mobile communications device; and classifying the alert as being immediate or deferred based at least in part on the current activity. If the alert is immediate, the processor can be further configured for announcing the alert without delay. Otherwise, the processor can be further configured for announcing the alert after a delay. The delay can terminate when at least one of a holdback timer expires and the current activity changes to an activity that indicates that the user can be notified.

In some embodiments, the sensor can be provided on the mobile communications device.

In some embodiments, the sensor can be at least one of an accelerometer, a light sensor, and a global positioning system (GPS) receiver.

In some embodiments, the system can further include a wearable device and the sensor can be provided on a wearable device. The mobile communications device and the wearable device can each include a wireless communication system. The mobile communications device can receive at least one of the sensor data and the current activity from the wearable device via the wireless communication subsystem.

In some embodiments, the processor can be provided on the mobile communications device.

In accordance with another embodiment, there is provided a method for managing alerts of a mobile communications device. The method can involve using a sensor to monitor activity of a user of the mobile communications device and generate sensor data indicative of the activity; processing the sensor data to determine a current activity of the user; detecting an alert corresponding to an incoming communication from a wireless network to the mobile communications device; and determining whether the incoming communication is urgent or not urgent. If the alert is urgent, the method can further involve announcing the alert without delay. Otherwise, the method can further involve determining whether the user is available or unavailable. When the current activity indicates that the user can be notified, the method can determine that the user is available and announce that the alert without delay. When the current activity indicates that the user cannot be notified, the method can determine that the user is unavailable. When the user is unavailable, the method can involve announcing the alert after a delay. The delay can terminate when at least one of a holdback timer expires and the current activity changes to an activity that indicates that the user can be notified.

Further aspects and advantages of the embodiments described herein will appear from the following description taken together with the accompanying drawings.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which.

Figure 1:
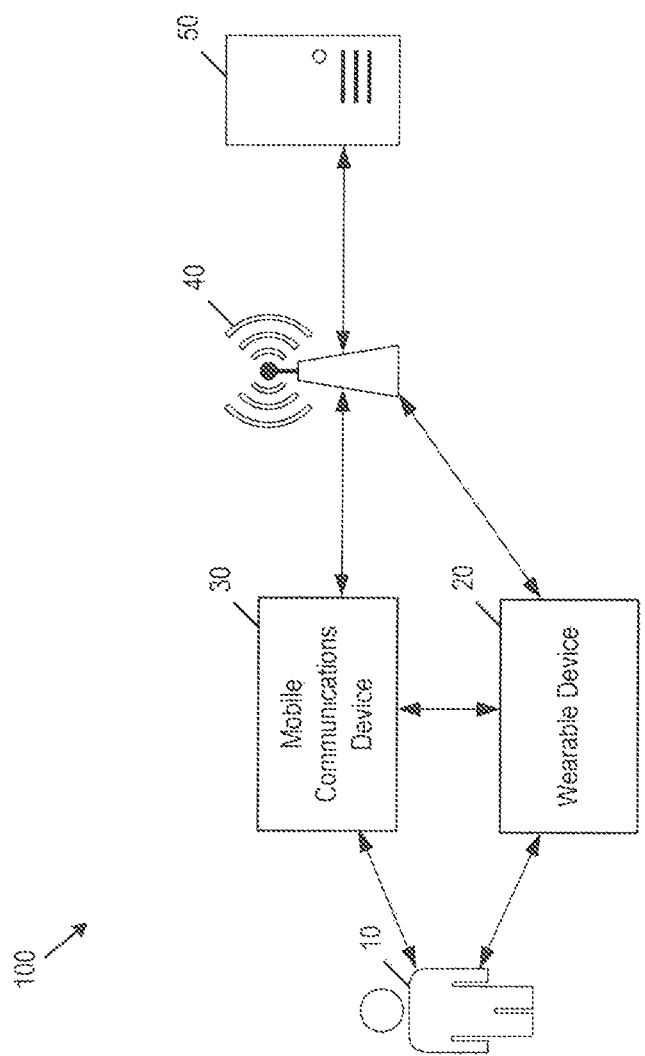
FIG. 1 is a block diagram illustrating the configuration of a mobile communications device according to at least one embodiment.

The skilled person in the art will understand that the drawings, described below, are for illustration purposes only. The drawings are not intended to limit the scope of the applicants' teachings in anyway. Also, it will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF VARIOUS EMBODIMENTS

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud based program or system, laptop, personal data assistance, cellular telephone, smartphone, or tablet device.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that the term "coupled" used herein indicates that two elements can be directly coupled to one another or coupled to one another through one or more intermediate elements.

FIG. 1 is a block diagram illustrating configuration 100 for a mobile communications device 30 according to at least one embodiment. In configuration 100, a user 10 has a wearable device 20 and the mobile communications device 30. The mobile communications device 30 exchanges communication signals with a wireless network 40. In some embodiments, the wearable device 20 also exchanges communication signals with the wireless network 40. In some embodiments wherein the wearable device 20 is not equipped to communicate with the wireless network 40, the mobile communications device 30 and the wearable device 20 exchange data with one another directly. In some embodiments wherein the wearable device 20 is equipped to communicate with the wireless network 40, the mobile communications device 30 and the wearable device 20 exchange data with one another indirectly, that is via the wireless network 40.

The wireless network 40 further exchanges communication signals with a remote server 50. The mobile communications device 30 can exchange data with the remote server 50 via the wireless network 40. In addition, the mobile communications device 30 may exchange data with the remote server 50 via other networks (not shown), such as the Internet.

Figure 2:
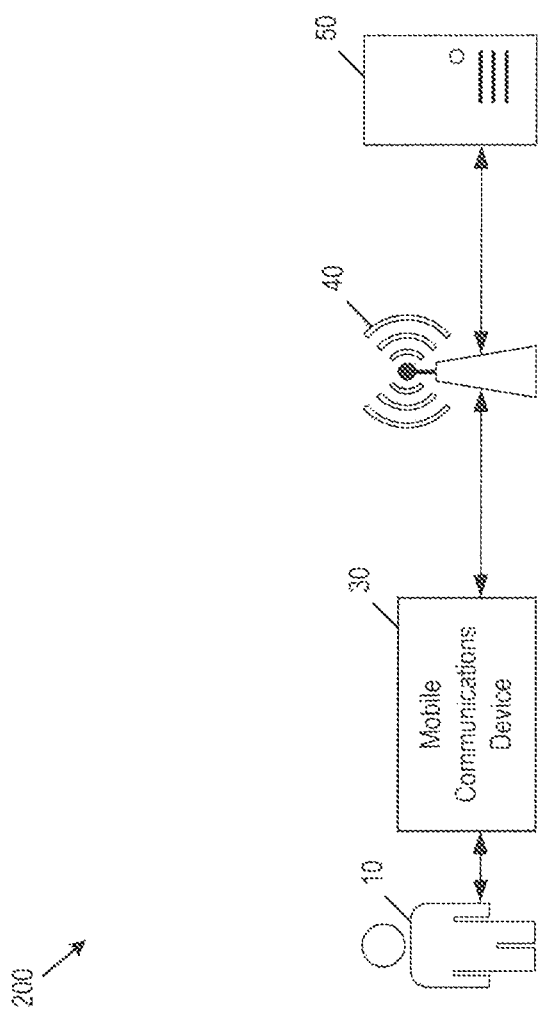
FIG. 2 is a block diagram illustrating the configuration of a mobile communications device according to at least another embodiment.

FIG. 2 is a block diagram illustrating configuration 200 for a mobile communications device 30 according to at least another embodiment. In configuration 200, a user 10 has the mobile communications device 30 but does not have a separate wearable device 20. Similar to configuration 100, the mobile communications device 30 exchanges communication signals with a wireless network 40. The wireless network 40 further exchanges communication signals with a remote server 50. The mobile communications device 30 can exchange data with the remote server 50 via the wireless network 40.

Figure 3:
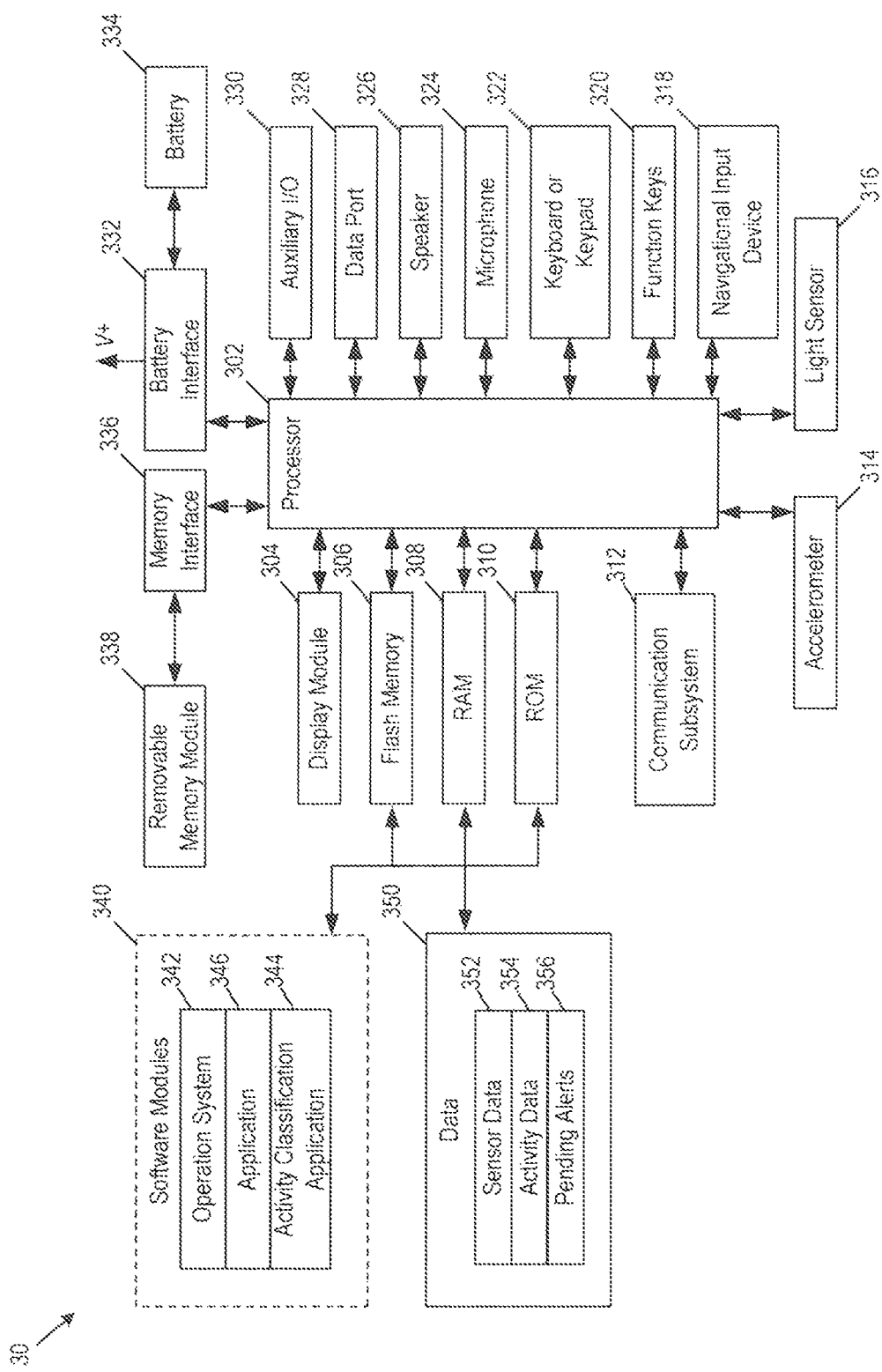
FIG. 3 is a schematic diagram of a mobile communications device 30 according to at least one embodiment.

FIG. 3 is a schematic diagram of a mobile communications device 30 according to at least one embodiment In some embodiments, the mobile communications device 30 is a handheld device. In some embodiments, the mobile communications device 30 is a wearable device.

The mobile communications device 30 includes at least one processor 302 such as a microprocessor, which controls the overall operation of the mobile communications device 30. The processor 302 can include multiple processors, or multi-core processors. The processor 302 can interact with each of the subsystems of the mobile communications device 30.

The mobile communications device 30 includes a wireless communication subsystem 312. The communication subsystem 312 is configured to provide communication services such as two-way data and voice communications via the wireless network 40. Communication services are provided by exchanging radiofrequency (RF) signals with the wireless network 40. Two-way data communications allow the mobile communications device 30 to communicate with other computer systems, via the Internet. Voice communications allow the mobile communications device 30 to communicate with other mobile communications devices.

In some embodiments, the communication subsystem 312 uses a plurality of communication technologies. For example, the mobile communications device 30 may be equipped to communicate via any one or combination of cellular communication technologies (e.g., 2G, 3G, 4G, etc. . . . ), Wi-Fi communication technologies (e.g., 802.11, WiMAX, etc. . . . ), or any other appropriate wireless communication technology. For example, the communication subsystem 312 may be configured to communicate with the wearable device 20 directly using a short range or near-field communication technology. In some embodiments, the communications subsystem 312 may directly communicate with the wearable device 20 using Bluetooth®.

The communication subsystem 312 generally includes a receiver (not shown), a transmitter (not shown), one or more antennas (now shown), and a processing module, such as a digital signal processor (DSP). The specific design and implementation of the communication subsystem 312 depends on the particular communication technologies.

The communication technologies can support communications such as voice-based communications; electronic mail (email); text messaging, including short message service messaging (SMS) and multimedia messaging service (MMS); instant messaging; social network based messaging, device-to-device based messaging, or facsimile. Other forms of communication may also be employed.

The mobile communications device 30 may communicate with any one of a plurality of fixed transceiver base stations (not shown) of the wireless network 40 within its geographic coverage area. The mobile communications device 30 can send and receive communication signals over the wireless network 40 after network registration or activation procedures have been completed.

The mobile communications device 30 also includes input and output subsystems. The processor 302 interacts with the input and output subsystems. Input subsystems can include one or more of a display module 304, navigational input device 318, function keys 320, keyboard or keypad 322, and microphone 324. Output subsystems can include one or more of a display module 304 and speaker 326.

In some embodiments, the display module 304 can serve as an output subsystem as well as an input subsystem when it is a touchscreen display having a touch-sensitive overlay connected to an electronic controller. The touchscreen display can act as an input mechanism by providing a touch-sensitive input device. In other embodiments, the display module 304 is only an output subsystem when it is a non-touch display. When the display module 304 is only an output subsystem, the mobile communications device 30 generally includes another input subsystem such as a navigational input device 318, function keys 320, or keyboard or keypad 322. A navigational input device 318 can be a trackpad or trackball. Function keys 320 may be included on a key assembly.

The mobile communications device 30 also includes memory subsystems such as flash memory 306, random access memory (RAM) 308, read-only memory (ROM) 310, and memory interface 336. The processor 302 operates under stored program control and executes software modules 340 that are preferably stored in persistent memory. Persistent memory includes flash memory 306 and ROM 310. As illustrated in FIG. 3, the software modules 340 include operating system software 342 and software applications 346.

The software modules 340 or parts thereof can be temporarily loaded into volatile memory. Volatile memory includes RAM 308. Volatile memory can be used for storing runtime data variables and other types of data or information, as will be understood by those skilled in the art. Although specific functions are described for various types of memory, this is merely one example, and those skilled in the art will appreciate that a different assignment of functions to types of memory could also be used.

The software applications 346 can include a range of applications. Examples of applications include an address book application, a messaging application, a calendar application, and a notepad application. In some example embodiments, software applications 346 include email message applications, browser applications, push content viewing applications, voice communication (i.e. telephony) applications, geographical maps applications, and media player applications. Each of the software applications 346 can include layout information defining the placement of fields and graphic elements (e.g. text fields, input fields, icons, etc.) in the user interface (i.e. the display module 304) for that software application 346.

The mobile communications device 30 can also store data 350 in erasable persistent memory, such as flash memory 306. In some example embodiments, data 350 includes communication service data which is required by the mobile communications device 30 to establish and maintain communication with the wireless network 40. Data 350 can also include user application data such as email messages, contacts, calendar and schedule information, notepad documents, image files, and other commonly stored user information stored on the mobile communications device 30 by its user, and other data. Data 350 may be organized in a number of databases. Each database may contain data items of the same data type or associated with the same application. For example, email messages, contacts, and task items may be stored in individual databases within memory on the mobile communications device 30.

In some embodiments, the mobile communications device 30 also includes a removable memory module 338 and a memory interface 336. The removable memory module 338 can be a removable memory card such as flash memory or a Subscriber Identity Module (SIM) card. Network access may be associated with a subscriber or user 10 via the SIM card for use in a GSM network, or another type of memory card for use in the relevant wireless network type. The removable memory module 338 can be inserted in or connected to the memory card interface 336 of the mobile communications device 30 in order to operate in conjunction with the wireless network 40.

The mobile communications device 30 also includes auxiliary input/output (I/O) subsystems 330 and data port 328. In some embodiments, data port 328 can be one or more of a serial data port and a Universal Serial Bus (USB) data port. In some embodiments, the auxiliary I/O subsystems 330 may include an external communication link or interface, such as an Ethernet connection. The mobile communications device 30 may include other wireless communication interfaces for communicating with other types of wireless networks, for example, a GPS transceiver for communicating with a GPS satellite network (not shown). The auxiliary I/O subsystems 330 may include a haptic actuator for providing haptic feedback. For example, a vibrator may provide vibratory notifications for various events such as the receipt of incoming electronic communications or phone calls.

The mobile communications device 30 also includes a power source that provides electrical power to at least some of the electrical circuitry in the electronic device 100. The power source may be a battery 334. A battery interface 332 provides a mechanical and electrical connection for the battery 334. The battery interface 332 is coupled to a regulator (not shown) which provides power V+ to the circuitry of the mobile communications device 30. The battery 334 can be one or more rechargeable batteries. Rechargeable batteries can be charged through a charging circuitry coupled to a battery interface 332. For example, the battery 334 can be recharged via the data port 328.

The mobile communications device 30 can also include an encoder and/or decoder for decoding and encoding messages transmitted to and/or from the wireless network. The encoder and/or decoder can be provided for general transmission purposes including error correction, channel correction, modulation. The encoder and/or decoder can also perform encryption and decryption for enhanced security purposes. The encoder and/or decoder may be implemented by way of software containing instructions for configuring a processor to carry out the functions described herein. The software instructions may be stored on any suitable computer-readable memory, including CDs, RAM, ROM, Flash memory, etc.

It will be understood that the encoder and/or decoder described herein and the module, routine, process, thread, or other software component implementing the described method/process for configuring the encoder may be realized using standard computer programming techniques and languages. The present application is not limited to particular processors, computer languages, computer programming conventions, data structures, and other such implementation details. Those skilled in the art will recognize that the described processes may be implemented as a part of computer-executable code stored in volatile or non-volatile memory, as part of an application-specific integrated chip (ASIC), etc.

The mobile communications device 30 and/or the wearable device 20 can include various components that generate data. In this description, such components that generate data relevant to the activity of the user 10 of the mobile communications device 30 and/or the wearable device 20 are generally referred to as sensors.

Sensors can be traditional physical sensors, non-traditional physical sensors, and non-physical data sources. Sensors that provide data about the sensors physical environment as their primary function can be considered traditional physical sensors. Examples of traditional physical sensors include accelerometers 314, light sensors 316, motion sensors (not shown), heart rate monitors (not shown), gyroscopes (not shown), and proximity sensors (not shown). In handheld devices, accelerometers 314 can sense the way that the device is held in order to present landscape or portrait views on the display 304. Light sensors 316 can be used to detect ambient light in order to adjust the brightness of the display 304. Data from motion sensors can be correlated to a user activity. Heart rate monitors can measure a user's pulse, which can be correlated to the intensity of the user's activity.

Sensors that have another primary function but may also provide data about the sensors physical environment can be considered non-traditional physical sensors. Examples of non-traditional physical sensor include radio chip sets and radio frequency antennas (e.g., Wi-Fi, GPS, 2G, 3G, LTE, RFID, Bluetooth®, etc.), cameras, microphones 324, touchscreen displays 304, keypads 322, and navigation devices 318. Non-traditional physical sensors can provide information related to the location and the rate of motion of the mobile communications device 30.

Other data sources containing data relevant to the activity of the user 10 of the mobile communications device 30 and/or the wearable device 20 can be considered non-physical sensors. Examples of non-physical sensors include a clock, a timer, or an alarm application, which contain temporal data, and a calendar application, which contains scheduled activity data.

As described above, traditional alerts for incoming communication, such as voice calls, messages, email, and other forms of communication, on a mobile communications device 30 are provided at the time of arrival. The invention disclosed herein is directed to managing alerts for incoming communication based on the activity a user of the mobile communications device 30. An alert may be managed by allowing the alert to be provided immediately or deferring the alert to a later time. The activity of the user 10 of the wearable device 20 and/or mobile communications device 30 can be assessed to determine whether or not to provide the alert immediately at the time of arrival.

Furthermore, if it is determined that the alert should not be provided immediately at the time of arrival, the activity of the user 10 can be analyzed to determine a more suitable time to alert the user 10. Alerting the user 10 at a more suitable time can enhance the safety and productivity of the user 10. That is, the alert may be suppressed, or delayed for a specified period of time. Alternatively, the alert maybe suppressed, or delayed until the activity of the user 10 changes to an activity that is suitable for providing the alert.

For example, the user 10 may be an on-call hospital physician and incoming communication may relate to a call from the hospital. If the call arrives at a time when the physician is in the middle of a deep sleep cycle, the call would wake the physician from the deep sleep. Disruption of deep sleep cycles may reduce alertness and productivity the following day. However, if the alert is provided at the end of the deep sleep cycle, the physician may be more alert and productive the following day.

In another example, the user 10 may be driving and incoming communication may be a phone call, text message, or email. If the alert for the incoming communication is provided while the user 10 is driving, the alert may distract the user 10. Driving distractions can impede safety. However, if the alert is provided when the vehicle has come to a complete stop, driving distractions can be reduced and safety improved.

The determination of the activity of the user 10 generally involves the mobile communications device 30 obtaining sensor data 352 from various sensors on the mobile communications device 30 itself (see e.g., configuration 200 of FIG. 2) and/or the wearable device 20 (see e.g., configuration 100 of FIG. 1). The mobile communications device 30 uses a pre-configured activity classifier, or activity classification model, to identify an activity that correlates to the sensor data 352. The activity classifier can be developed and/or provided by the remote server 50.

Developing the activity classifier can be computationally intensive. Developing the activity classifier generally involves a data collection phase and a learning or training phase. In the data collection phase, a large volume of statistically significant sensor data 352 is collected and stored in memory. In the learning or training phase, the sensor data 352 (i.e., training data) is processed to develop a robust activity classification model. Once the activity classifier has been trained, the activity classification phase itself is less intensively demanding on processing resources.

In recent years, activity classification models have improved. For example, activity classification models have improved from determining that a user 10 is simply asleep to distinguishing which part of the sleep cycle the user 10 is in. In addition, activity classification models can identify other activities, such as driving and cycling, or if the user 10 is in a court of law or an emergency operation room.

Furthermore, a user 10 may define new activities that are not already identified in the activity classification models. The user 10 can define the new activity in relation to various sensor data 352. Once the new activity is defined, the activity classification model can process sensor data 352 to identify the new activity.

In at least one example embodiment, the method of managing alerts, including the pre-configured activity classifier, can be implemented within the software modules 340, such as an activity classification application 344. The activity classification application 344, when executed by the processor 302, can configure the processor 302 to implement one or more of the methods or processes described herein, including supplying training data to the remote server 50 and/or making an activity classification based on current sensor data 352 and the pre-configured activity classifier received from the remote server 50.

In at least one example embodiment, the activity classification application 344 can configure the processor 302 to supply current sensor data 352 to the remote server 50 and receive the current activity from the remote server 50. In this case, the pre-configured activity classifier remains on the remote server 50 and is not implemented within the activity classification application 344.

In some embodiments, the pre-configured activity classifier can determine a particular activity indicated by the sensor data 352. For example, the pre-configured activity classifier may be capable of identifying sleeping, driving, and cycling activities. In some embodiments, the pre-configured activity classifier is includes one or more activity classifiers, each activity classifier being dedicated to a single, or a limited number of activities. In the case of an activity classifiers that are each limited to a single activity, each activity classifier may determine whether the sensor data 352 indicates that single activity or not (e.g., true or false).

In some embodiments, the pre-configured activity classifier may be distributed between the remote server 50 and the activity classification application 344 on the mobile communications device 30. For example, the activity classification application 344 may include a single activity classifier, such as a sleep activity classifier. In the event that the sleep activity classifier determines that the current sensor data 352 does not indicate a sleep activity, the current sensor data 352 may be transmitted to the remote server 50 for further processing to determine the current activity, such as driving or cycling. The distribution of the activity classifier model amongst the remote server 50 and/or the mobile communications device 30 may be advantageous depending on the processing demands of the activity classifier and the delay in transmission of data between the mobile communications device 30 and the server 50.

Data 350 can include sensor data 352 generated by the various sensors on the mobile communications device 30 and/or the wearable device 20 and activity data 354 generated by the activity classifier based on the sensor data.

A plurality of sensor data 352, from different sensors or from the same sensor over a period of time, may be combined to create a block or set of sensor data 352 or readings that can be correlated to some activity. In some embodiments, only a subset of the plurality of sensor data 352 is relevant to identifying a particular activity. When the activity classifier model is located on the remote server 50, only the relevant subset of sensor data 352 is transmitted to the remote server 50.

Sensor data 352 and activity data 354 may have a variety of different formats, including a matrix format. In some embodiments, activity data 354 may be stored as a one-dimensional matrix of readings for all possible activities. For example, the activity data 354 may have the following form:

$$y=[Activity|StartLocation|StartTime|EndLocation|EndTime|TimeElapsed] \qquad (1)$$

In equation (1), y represents the activity data 354 of the user 10. The Activity element can be indicative of a type of activity, such as sleeping, driving, or cycling. The StartLocation element and the StartTime element can be indicative of the location of the user and a time reference of when the beginning of an activity is detected. Similarly, the EndLocation element and the EndTime element can be indicative of the location of the user and a time reference of when the end of an activity is detected. The TimeElapsed element can be indicative of the time elapsed in that activity. When a current activity is in progress, the EndLocation element and the EndTime element may be null and the the TimeElapsed element is continuously updated.

In some embodiments, activity data 354 may be stored with a state field or a plurality of state fields or flags. When a plurality of state fields or flags is provided, a single state field or flag may be provided for each defined activity. In some embodiments, the state flags may comprise a single bit flag. In some embodiments, the state fields may comprise more than one bit fields. The state fields may represent the probability of each activity. The number of bits allocated to each activity may depend on the probability of accuracy desired. The probability of accuracy may depend on the source of the activity classifier.

The invention disclosed herein is directed to managing alerts for incoming communication based on the activity of the user 10 of the mobile communications device 30. An alert may be managed by allowing the alert to be provided immediately or deferring the alert to a later time. The activity of the user 10 of the wearable device 20 and/or mobile communications device 30 can be assessed to determine whether or not to provide the alert immediately at the time of arrival.

Furthermore, if it is determined that the alert should not be provided immediately at the time of arrival, the activity of the user 10 can be analyzed to determine a more suitable time to alert the user 10. Alerting the user 10 at a more suitable time can enhance the safety and productivity of the user 10. That is, the alert may be suppressed, or delayed, or deferred for a specified period of time. Alternatively, the alert maybe suppressed, or delayed, or deferred until the activity of the user 10 changes to one in which it is suitable to provide the alert.

Having determined the activity of the user 10, alerts for incoming communications on the mobile communications device 30 can be managed based on the activity. Alerts that are suppressed, or delayed, can be stored in data 350 as pending alerts 356. After the specified delay or suppression period, or when the activity is suitable for providing alerts, the mobile communications device 30 provides the stored pending alerts 356 to the user 10. Managing alerts can include rejecting voice calls. Alerts for rejected voice calls are also stored as a pending alert 356.

In some embodiments, the pending alerts 356 may be provided in the order that the incoming communication arrived. That is, pending alerts 356 may be provided on a first in, first out ("FIFO") basis. In some embodiments, the pending alerts 356 may be provided in reverse order that the incoming communication arrived. That is, pending alerts 356 may be provided on a last in, first out ("LIFO") basis. The selection between FIFO and LIFO may be a pre-selected user configuration.

In some embodiments, pre-selected user configurations may also configure the mobile communications device 30 to provide the pending alerts 356 in order of type of communication. That is, pending alerts 356 may be provided for voice calls first, followed by messages (SMS and MMS), followed by emails, followed by instant messaging, followed by social network based messaging etc.

Furthermore, when the pending alerts 356 are provided based on type of communication, pending alerts 356 for each type of communication may be provided on a FIFO or LIFO basis. For example, pending alerts 356 may be provided in order of type of communication and a FIFO basis, wherein voice calls are provided before SMS messages. In this example, a first SMS may be received prior to a voice call, and a second SMS may be received after the voice call. The pending alert 356 for the voice call would be provided first because voice calls have higher precedence. After the pending alert 356 for the voice call; the pending alert 356 for the first SMS would be provided second, followed by the pending alert 356 for the second SMS because of the FIFO basis.

In some embodiments, the provision of pending alerts 356 are subject to the device settings of the mobile communications device 30. That is, the provision of pending alerts 356 does not override the device settings of the mobile communications device 30. For example, the device setting of the mobile communications devices 30 may be configured to announce, or annunciate, alerts when the device is in "normal" mode and to vibrate for alerts when the device is in "silent" mode. Therefore, when the mobile communications device 30 is in "normal" mode, pending alerts 356 are announced. When the mobile communications device 30 is in "silent" mode, a vibratory notification is provided for pending alerts 356.

In some embodiments, the provision of pending alerts 356 can be configured by the user 10 to override the device settings of the mobile communications device 30. The user 10 may configure the provision of pending alerts 356 after a specific activity to override a particular device setting. For example, a user 10 may set the device setting of a mobile communications device 30 to "silent" mode upon entering court and forget to change the device setting back to "normal" upon leaving court. The user 10 may configure the provision of pending alerts 356 after court to override the "silent" mode. That is, after court, pending alerts 356 may be provided under "normal mode" (e.g., announced) despite the device setting being in "silent mode" (e.g., vibrate).

Furthermore, the device settings may designate particular alerts for particular communications. The alert corresponding to a text message is stored as the pending alert 356 for a text message. The alert (i.e., ring tone) corresponding to a voice call from a particular contact is stored as the pending alert 356 for a voice call from that particular contact.

The user 10 can pre-configure a time duration or activity that alerts for incoming communications should be managed. For example, a user 10 may expect to be in transit each day between 8:00 AM to 9:00 AM and 5:00 PM to 6:00 PM. The user 10 may configure the mobile communications device 30 to manage all incoming communications during these time periods.

In addition, a user 10 may define different activities in which incoming communication is permitted. For example, a user 10 may define driving as an activity that does not permit text messages but does permit voice calls because the user 10 has a Bluetooth® headset from which to receive voice calls. However, another user 10 that does not use a Bluetooth® headset may not receive text messages or voice calls when driving.

In some embodiments, incoming communications may be associated with a priority level. Alerts for the incoming communication may be managed based on the associated priority level. For example, the alert for incoming communications having a high priority level, such as "urgent", may be provided immediately. Alerts for incoming communications without a high priority level, or with a low priority level, may be suppressed to a later time.

In some embodiments, the priority level may be provided by an indicator. For example, a text or multimedia message may include a priority level indicator in the metadata or in the body of the message. The remote server 50 may process the text or multimedia message and recognize the priority level indicator.

In some embodiments, the priority level may be determined by a threshold number of communications from a particular originating phone number. For example, three (3)

calls from a particular originating phone number may be indicative of a high priority level. The remote server 50 may maintain a log of incoming communications and compare the incoming communications with the thresholds. The user 10 may pre-configure the thresholds. Furthermore, the thresholds may be specific to particular phone numbers. As well, a threshold may relate to a plurality of numbers. For example, three (3) calls from any one of two originating phone numbers may be indicative of a high priority level.

In some embodiments, the threshold number of communications from a particular originating phone number may be subject to a particular time duration. For example, three (3) calls within five (5) minutes from a particular originating phone number may be indicative of a high priority level.

In some embodiments, the priority level may be determined by the originating phone number. For example, calls from a particular phone number at the hospital may be indicative of a high priority level. In some embodiments, the priority level may be provided by a side channel to the remote server 50. That is, a side channel, such as data communication, may be used to indicate that the next incoming communication is a high priority level. For another example of a side channel, a text message may precede a voice call to indicate that the next voice call is a high priority level.

In some embodiments, settings may be provided to override, or ignore, priority levels. That is, a user 10 may configure the mobile communications device 30 to manage alerts for incoming communications irrespective of whether the incoming communication has an associated priority level. For example, data communication may be initially received indicating that the next incoming communication is a high priority level. Normally, the mobile communications device 30 would recognize the high priority level and provide an immediate alert for the incoming communication. However, the user 10 may elect to override the priority levels because they are entering surgery. In this case, the override the priority level causes the mobile communications device 30 to ignore the high priority level and to manage the incoming communication by suppressing the alert until the user 10 is out of surgery.

In some embodiments, settings may be provided for the user 10 to configure the mobile communications device 30 to manage alerts for incoming communications that are received from a particular paging system. The mobile communications device 30 can utilize an algorithm to determine whether the incoming communication is received from the particular paging system. If the incoming communication is received from the particular paging system, the mobile communications device 30 can manage the alert for the incoming communication. If incoming communication is not received from the particular paging system, the mobile communications device 30 can allow the alert to be immediately provided, as normal.

In some embodiments, a notice may be provided to indicate that the incoming communication is being managed. Such notices may be provided in response to an incoming communication that requests a confirmation receipt or a read receipt. The notice may be provided via the wireless network 40. The notice may be provided in the same form as that of the incoming communication. For example, when the incoming communication is a text message, the notice may be provided via text message. When the incoming communication is a phone call, the notice may be provided as an audio message.

In some embodiments, the notice may be provided to a communications device from which the incoming communication originates. For example, the notice may be provided to an originating phone number for the incoming communication.

In some embodiments, the notice may be provided to a communications device that is different from that which the incoming communication originates. For example, incoming communication may be received from a hospital for an on-call physician. Notice that the incoming communication is being managed may also be provided to the physician's office.

Such settings to provide notices, manage alerts based on a particular paging system, manage alerts based on a priority level may be configured by the user 10 at the mobile communications device 30 and/or provided to the remote server 50.

Figure 4:
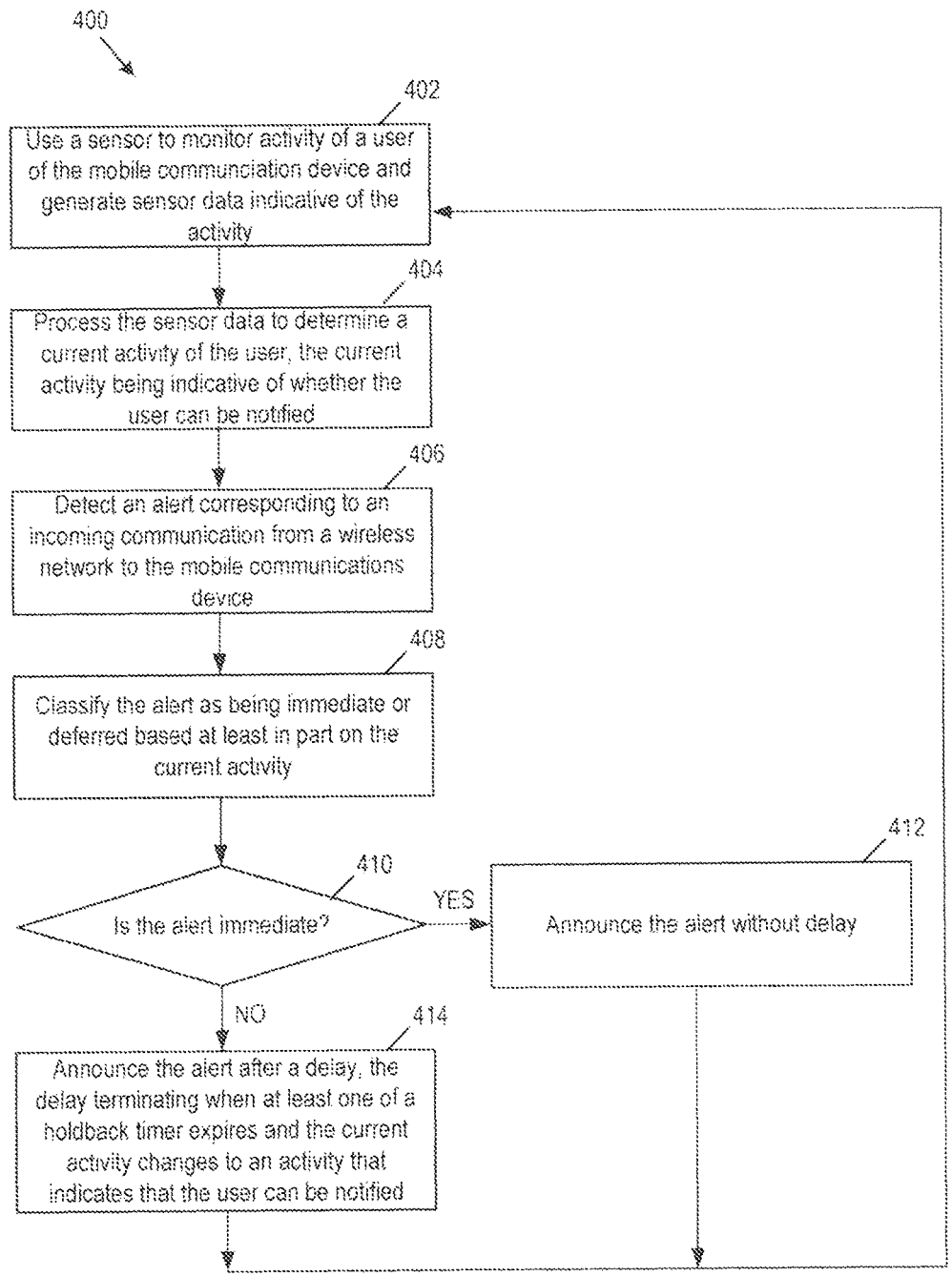
FIG. 4 is a flowchart illustrating a method of managing alerts for incoming communications, according to at least one embodiment.

FIG. 4 is a flowchart that illustrates the basic steps 400 taken by a mobile communications device 30 to manage alerts for incoming communications, according to at least one embodiment. The method 400 begins at step 402 by using a sensor to monitor activity of a user 10 of the mobile communications device 30 and generate sensor data indicative of the activity. The sensor can be one or more sensors. Each sensor can be a traditional physical sensor (e.g., detecting heart rate, ambient light, etc. . . . ), non-traditional physical sensors (e.g., detecting location), or a non-physical data sources (e.g., storing scheduled activities).

In some embodiments, the sensor may be provided on a wearable device 20. When the sensor is provided on a wearable device 20, the mobile communications device 30 may receive the sensor data from the wearable device 20.

At step 404, the mobile communications device 30 processes the sensor data to determine a current activity of the user 10. In some embodiments, when the sensor is provided on a wearable device 20, the wearable device 20 may include a processor and the wearable device 20 may perform step 404. That is, the wearable device 20 may process the sensor data to determine a current activity of the user 10. When the wearable device 20 performs step 404, the mobile communications device 30 may receive the current activity of the user 10 from the wearable device 20. When the mobile communications device 30 receives the current activity of the user 10 from the wearable device 20, the mobile communications device 30 may not receive the sensor data from the wearable device 20. In some embodiments, part of the processing of the sensor data may be performed by the wearable device 20 and part of the processing of the sensor data may be performed by the mobile communications device 30. For instance, less intensive processing may be performed by the wearable device 20 to reduce the data load being communicated to the mobile communications device 30.

The current activity of the user 10 may be indicative of whether the user 10 can be notified. The mobile communications device 30 may store possible activities. Furthermore, for each possible activity, the mobile communications device 30 may be configured to determine whether alerts can be provided to the user 10 when the user 10 is in that activity. Such configurations may be established by a database or a look-up table stored on the mobile communications device 30 or the remote server 50. In some embodiments, determining whether alerts can be provided to the user 10 when the user is in that activity may further depend on the type of incoming communication. That is, whether the incoming communication is audio-based, such as voice calls, or display/text-based, such as email, text messages, multi-media messages, and instant messaging.

At step 406, the mobile communications device 30 detects an alert corresponding to an incoming communication from a wireless network 40 to the mobile communications device 30. For instance, the mobile communications device 30 may detect that the incoming communication is a phone call and that the alert is representative of a phone call. Alternatively, the mobile communications device 30 may detect that the incoming communication is a text message and that the alert is representative of a text message. Furthermore, the mobile communications device 30 may determine that the incoming communication is a phone call from a particular contact. Accordingly, the alert may be representative of a phone call from that particular contact.

At step 408, the mobile communications device 30 classifies the alert as being immediate or deferred, based at least in part on the current activity.

If at step 410, the mobile communications device 30 determines that the alert is classified as being immediate, the method proceeds to step 412. At step 412, the mobile communications device 30 announces the alert without delay. Announcing the alert without delay involves announcing the alert immediately. That is, announcing the alert without delay involves the mobile communications device 30 announcing the alert at the time of arrival, or "as normal" without the alert being managed.

After step 412, the method returns to step 402. That is, after the alert for the incoming communication is announced, the method 400 begins again at step 402.

If, at step 410, the mobile communications device 30 determines that the alert is classified as being deferred, the method proceeds to step 414. At step 414, the mobile communications device 30 announces the alert after a delay. The delay can terminate when the holdback timer expires. The delay can also terminate when the current activity changes to an activity that indicates that the user 10 can be notified.

Figure 5:
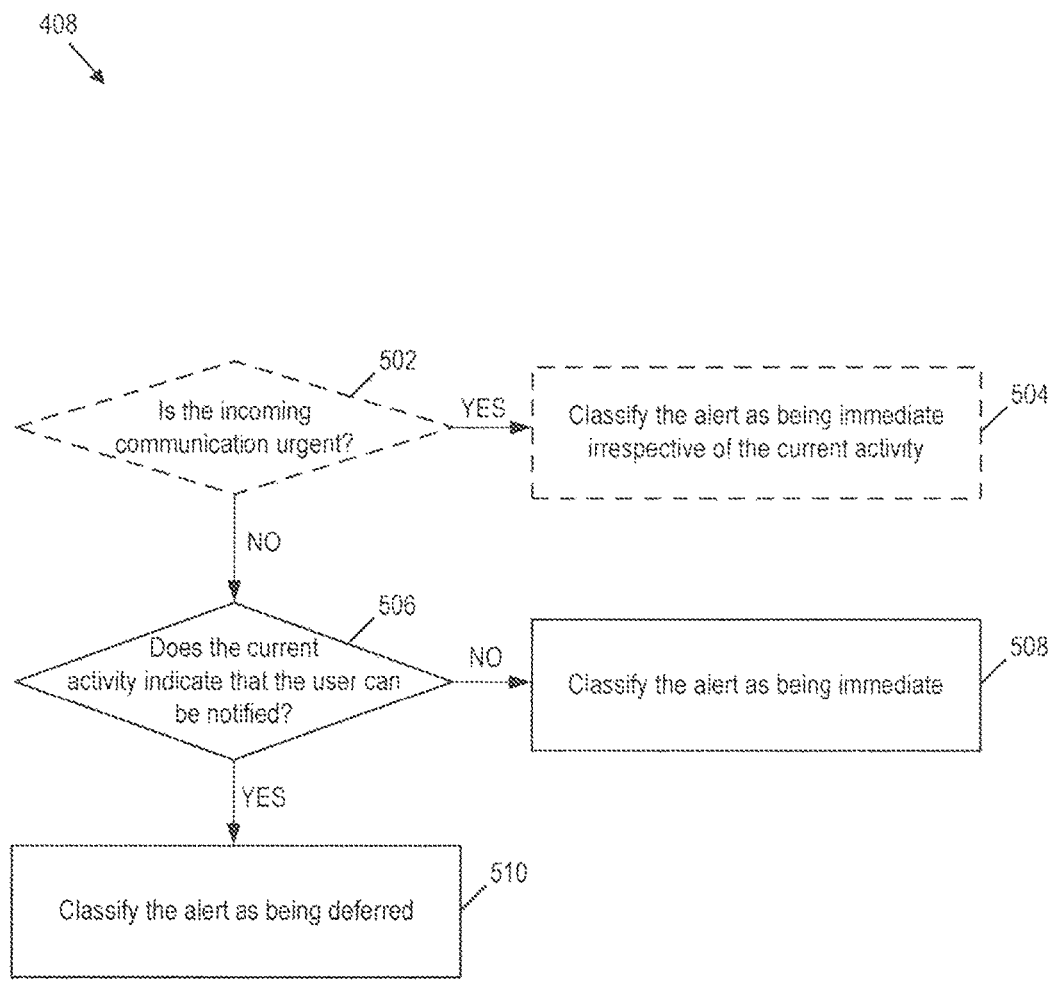
FIG. 5 is a flowchart illustrating a method of classifying an alert as being immediate or deferred based at least in part on the current activity, according to at least one embodiment.

FIG. 5 is a flowchart that illustrates steps taken by a mobile communications device 30 to classify the alert as being immediate or deferred based at least in part on the current activity at step 408, according to at least one embodiment.

In some embodiments, the incoming communication can be urgent and should not be managed. At step 502, the method involves determining whether the incoming communication is urgent or not urgent. In some embodiments, an indicator may be provided to indicate that the incoming communication is urgent. The indicator may be included in metadata of a message, the message itself (i.e., body of the message), or provided by a side channel. If an urgent indicator is detected, the incoming communication can be determined to be urgent.

In some embodiments, the incoming communication can be determined to be urgent based on the origin of the incoming communication. The origin of the incoming communication can relate to a phone number. The mobile communications device 30 can access a database of pre-defined phone numbers from which communications are urgent. The mobile communications device 30 can determine whether the phone number of the incoming communication corresponds to one of the pre-defined phone numbers; if so, then determine that the incoming communication is urgent. If the phone number of the incoming communication does not correspond to one of the pre-defined phone numbers, then the mobile communications device 30 can determine that the incoming communication is not urgent.

In some embodiments, the incoming communication can be determined to be urgent based on the origin of the incoming communication and the number of incoming communications from the same origin that are currently delayed. For example, a first call from a particular phone number can be determined to be not urgent. A second call from the same phone number can also be determined to be not urgent. However, a third call from the same phone number can be determined to be urgent.

If the mobile communications device 30 determines, at step 502, that the incoming communication is urgent, the mobile communications device 30 proceeds to step 504 and classifies the alert as being immediate. Classifying the alert as being immediate at step 504 is performed irrespective of the current activity. That is, even if the current activity indicates that the user 10 cannot be notified, the mobile communications device 30 classifies the alert as being immediate.

After step 504, the method returns to step 410 of FIG. 4. That is, after the alert for the incoming communication is classified as being immediate, the method 400 continues to step 410 shown on FIG. 4.

If the mobile communications device 30 determines, at step 502, that the incoming communication is not urgent, the mobile communications device 30 proceeds to step 506. At step 506, the mobile communications device 30 determines whether the current activity indicates that the user can be notified. The mobile communications device 30 may have access to a database of possible activities and for each possible activity, the database may include an indicator of whether or not the user 10 can be notified. When such a database is accessible, the mobile communication device 30 may, at step 506, perform a look-up of the current activity to determine whether the activity permits the user 10 to be notified.

If the mobile communications device 30 determines, at step 506 that the user can be notified, the mobile communications device 30 proceeds to step 508 and classifies the alert as being immediate. That is, if the incoming communication is not urgent and if the current activity indicates that the user 10 can be notified, the mobile communications device 30 classifies the alert as being immediate.

Similar to step 504, after step 508, the method returns to step 410 of FIG. 4. That is, after the alert for the incoming communication is classified as being immediate, the method 400 continues to step 410 shown on FIG. 4.

If the mobile communications device 30 determines, at step 506 that the user cannot be notified, the mobile communications device 30 proceeds to step 510 and classifies the alert as being deferred. That is, if the incoming communication is not urgent and if the current activity indicates that the user 10 cannot be notified, the mobile communications device 30 classifies the alert as being deferred.

Similar to steps 504 and 506, after step 508, the method returns to step 410 of FIG. 4. That is, after the alert for the incoming communication is classified, the method 400 continues to step 410 shown on FIG. 4.

The example provided in FIG. 4 describes embodiments wherein incoming communication is managed when "not urgent" and then not managed when "urgent". The incoming communication can be determined to be "urgent" based on an indicator or an originating phone number. In some embodiments, the converse may be applicable. That is, incoming communication may, by default, not be managed and then managed when "not urgent" In this case, the incoming communication can be determined to be "not urgent" based on an indicator or an originating phone number. For example, the indicator or the originating phone number may identify a hospital paging system.

The expressions "urgent" and "not urgent" are used to provide an exemplary priority levels. However any appropriate labels can be used. In general, the labels "urgent" and "not urgent" or priority levels, are representative of indicators, from the originator of the incoming communication, to indicate to the mobile communications device 30 whether or not the incoming communication should be managed.

In the example that the incoming communication is by default, not managed and then managed when from a paging system (i.e., "not urgent"), the mobile communications device 30 may classify the alert as being immediate irrespective of the current activity when the incoming communication is not from the paging system ("urgent"). If the incoming communication is from the paging system ("not urgent") and the current activity indicates that the user 10 can be notified, the mobile communications device 30 may classify the alert as being immediate. If the mobile communications device 30 determines that the user cannot be notified, the mobile communications device 30 classifies the alert as being deferred. That is, if the incoming communication is from the paging system ("not urgent") and if the current activity indicates that the user 10 cannot be notified, the mobile communications device 30 classifies the alert as being deferred.

It should be noted that steps 502 and 504 are shown in FIG. 5 with dashed lines, indicating that these steps are optional. In some embodiments such as FIG. 5, priority levels such as "urgent" and "not urgent" are considered for the classification of the alert as being immediate or deferred. However, in some embodiments, priority levels are not considered for this classification. When priority levels are not used, the alert can be classified as being immediate or deferred based only on the current activity.

Figure 6:
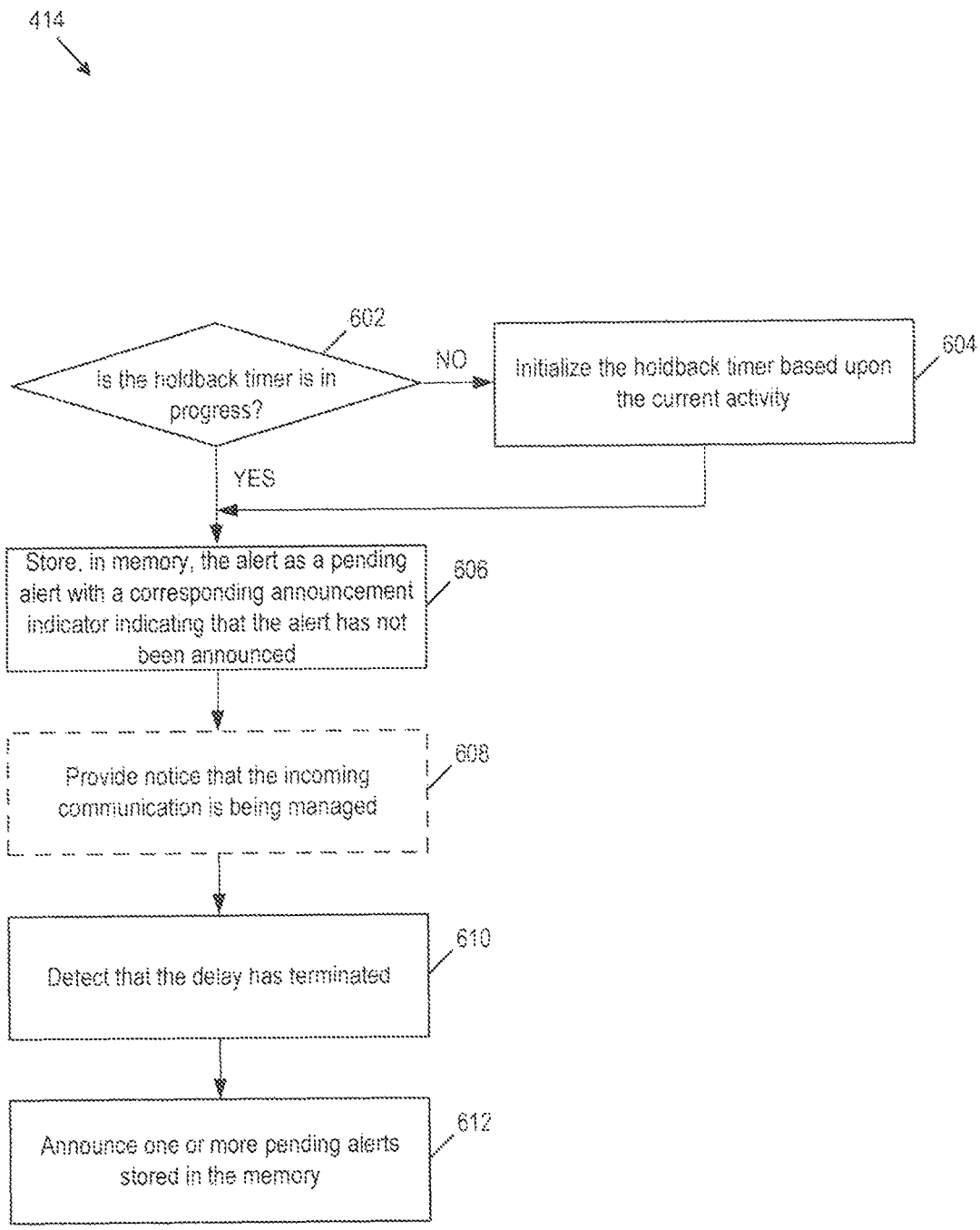
FIG. 6 is a flowchart illustrating a method of announcing an alert after a delay, according to at least one embodiment.

FIG. 6 is a flowchart that illustrates steps taken by a mobile communications device 30 to announce the alert after a delay at step 414, according to at least one embodiment.

At step 602, the mobile communications device 30 determines whether a holdback timer is in progress. A holdback timer may be in progress if another incoming communication has already been received and is in the process of being delayed. That is, during the delay period between a first incoming communication and the communication of the alert for the first incoming communication, a second incoming communication is received. Upon receipt of the second incoming communication, the mobile communications device 30 will determine that the holdback timer is in progress.

If at step 602, the mobile communications device 30 determines that a holdback timer is not in progress, the method proceeds to step 604.

At step 604, the mobile communications device 30 initializes the holdback timer based upon the current activity.

To initialize the holdback timer, the mobile communications device 30 can determine a time duration at which the holdback timer will expire. The time duration can correspond to the current activity. In some embodiments, the time duration may be determined by accessing a database, such as a look-up table. For example, if the activity relates to the user 10 being in court, the time duration may be 60 minutes. In another example, if the activity relates to the user 10 driving, the time duration may be 30 minutes.

In some embodiments, the time duration can be more complex and be determined using the sensor data. For example, in some cases, the determination of the time duration can further depend on the time elapsed in the current activity. In such cases, the database can store minimum time durations in a particular activities. For example, the minimum time duration for "deep sleep" may be seven (7) minutes. The minimum time duration may be determined by accessing a database, such as a look-up table. The mobile communications device 30 may determine from the sensor data that the user 10 has been in "deep sleep" for four (4) minutes. The mobile communications device 30 may then determine that the difference between the minimum time duration and the time elapsed in the current "deep sleep" is three (3) minutes. Accordingly, the mobile communications device 30 can determine that the holdback timer should expire in three (3) minutes so that the user 10 can complete the current deep sleep before the alert is announced.

Once the holdback timer is initialized, the time remaining begins to decrease until it reaches zero, at which point, the timer is expires. Returning to the above example of the minimum time duration for "deep sleep" being 7 minutes and the user 10 having been in the "deep sleep" for 4 minutes, the time duration of 3 minutes allows the user 10 to complete the minimum time duration for "deep sleep" before the time remaining expires and the alert is provided. Alternatively, if the user 10 has been in "deep sleep" for 2 minutes, the time duration would be 5 minutes.

After the holdback timer is initialized at step 604, the method proceeds to step 606.

If at step 602, the mobile communications device 30 determines that a holdback timer is in progress, the method proceeds to directly to step 606.

At step 606, the alert is stored as a pending alert. The pending alert is stored with a corresponding announcement indicator indicating that the alert has not been announced.

In some embodiments, after step 606, the method proceeds to step 608. At step 608, the mobile communications device 30 may provide notice that the incoming communication is being managed.

After step 606 and/or step 608, the method proceeds to step 610. At step 610, the mobile communications device 30 detects that the delay has terminated. That is, the mobile communications device 30 at step 610, monitors the holdback timer and the current activity to determine whether the delay has terminated. The delay terminates when at least one of the holdback timer expires and the current activity of the user 10 changes to an activity that permits the user 10 to be notified.

After step 610, the mobile communication device 30 communicates the alert to the user 10. For example, a user 10 may not be notified when the user is in a deep sleep cycle. The average time that the user typically spends in a deep sleep cycle may be known. Initially, the current activity of the user 10 may indicate that the user is in a deep sleep cycle and a holdback timer corresponding to the end of the user's deep sleep cycle may be provided. Once the holdback timer expires, that is, when the user's deep sleep cycle completes, the alert is announced to the user 10 at step 612.

For another example, a user 10 may not be notified when the user 10 is driving and the user 10 may be notified when the user is not driving. Initially, the current activity of the user 10 may indicate that the user 10 is driving. Subsequently, the user 10 may stop driving. Once the user 10 stops driving, that is, the current activity changes to an activity that permits the user 10 to be notified, the alert is announced to the user 10 at step 612.

At step 612, the mobile communications device 30 communicates the alert to the user 10 by annunciating one or more pending alerts stored in the memory. Pending alerts have corresponding announcement indicators indicating that the alert has not been announced. The pending alerts include the alert corresponding to the incoming communication. As set out above, pending alerts may be provided in the order that they were received. That is, if a first incoming communication is received before a second incoming communication, a stored alert for a first incoming communication is communicated to the user 10 before a stored alert for a second incoming communication is communicated to the user 10.

In some embodiments, after the mobile communications device 30 announces the alert to the user 10, the mobile communications device 30 can also change the announcement indicator to indicate that the alert has been announced (not shown). In other embodiments, after the mobile communications device 30 announces the alert to the user 10, the mobile communications device 30 can delete the alert from the pending alerts stored in the memory.

After step 612, the method returns to step 402 of FIG. 4. That is, after the alert for the incoming communication is communicated to the user 10, the method 400 begins again at step 402.

The announcement of alerts at steps 412 or 414 may be performed by the mobile communications device 30 and/or the wearable device 20. Alerts may be announced by any one or more of the output subsystems of the mobile communications device 30 such as the display module 304, speaker 326, or haptic actuator 330. Similarly, alerts may be announced by any one or more output subsystems of the wearable device 20 such as display module, speaker, or haptic actuator.

At any point during the method 400, the user 10 may provide a cancellation command to terminate the method 400. The cancellation command can be provided by terminating the activity classification application 344 or providing a specific cancellation command within the activity classification application 344. When a cancellation command is received, the method 400 proceeds to set the time remaining of the holdback timer to zero so that the pending alerts are immediately provided to the user 10.

Figure 7:
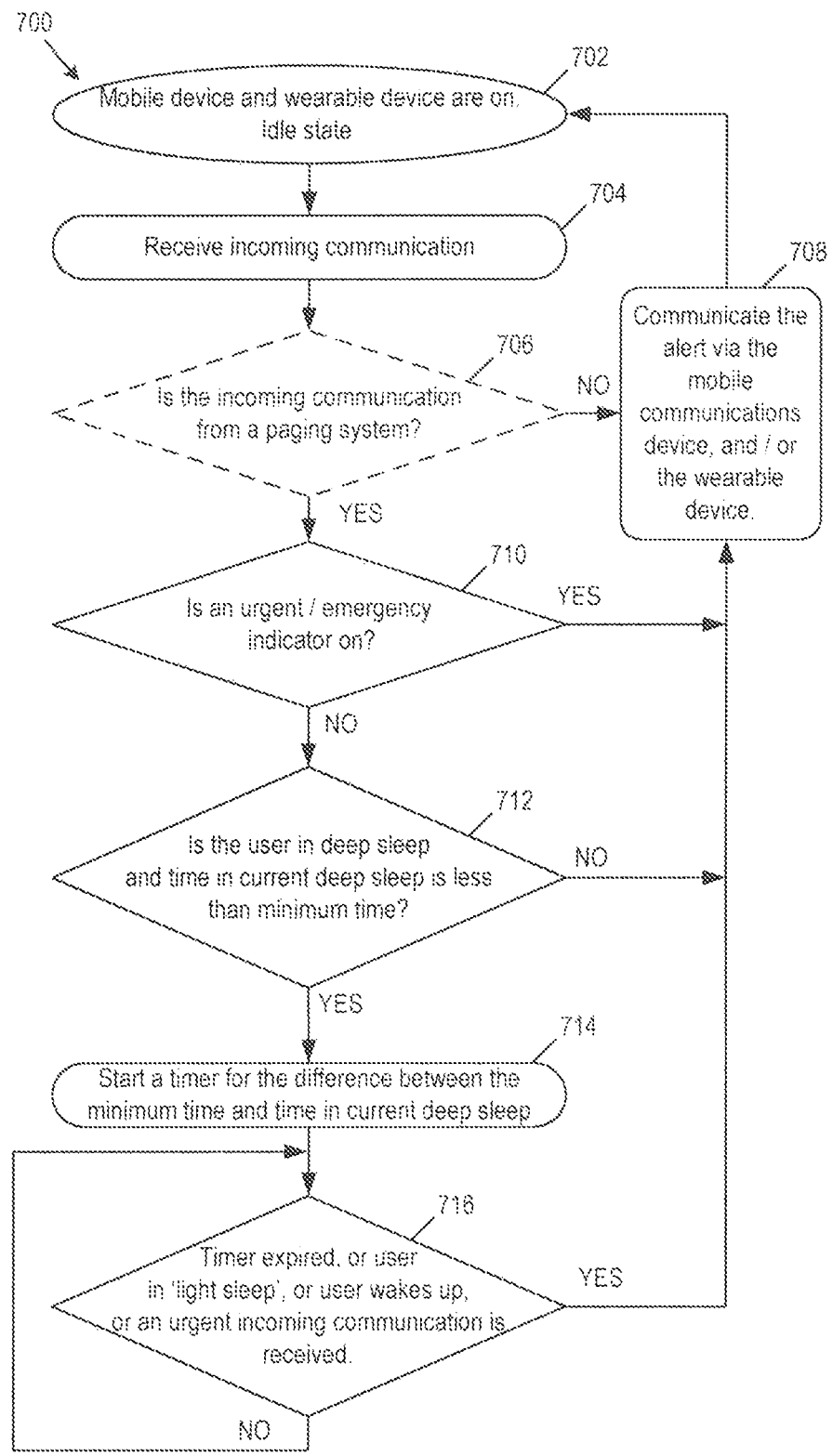
FIG. 7 is a flowchart illustrating a method of managing alerts for incoming communications when the user is in a deep sleep activity, according to at least one embodiment.

FIG. 7 is a flowchart that illustrates the basic steps 700 of a method to manage alerts for incoming communications when the user is in a deep sleep, according to at least one embodiment. The method 700 beings at step 702 with the mobile communications device 30 and the wearable device 20 being powered on and in an idle state.

At step 704, the mobile communications device 30 can receive the incoming communication. After step 704, the method proceeds to step 706. At step 706, the mobile communications device 30 determines the origin of the incoming communication. In particular, the mobile communications device 30 determines whether the incoming communication is from a paging system.

In this example embodiment, incoming communication is managed based on the origin of the incoming communication. If the incoming communication is not from a paging system, the method proceeds to step 708. At step 708, the mobile communications device 30 communicates the alert for the incoming communication.

If the incoming communication is from a paging system, the method proceeds to step 710. In this example embodiment, incoming communication is further managed based on whether or not the incoming communication is urgent, or an "emergency". In particular, indicators are provided to indicate that an incoming communication is urgent or an emergency. At step 710, the mobile communications device 30 determines whether an urgent or emergency indicator is on.

If the urgent or emergency indicator is on, the method proceeds to step 708. As set out above, at step 708, the mobile communications device 30 communicates the alert for the incoming communication.

If the urgent or emergency indicator is not on, the method proceeds to step 712. At step 712, the mobile communications device 30 determines whether the user 10 is in a deep sleep. If the user is in a deep sleep, the mobile communications device 30 also determines whether the user 10 has been in the current deep sleep for a period that is less than a pre-determined minimum time duration for deep sleeps.

If the user 10 is not in a deep sleep or if the period that the user 10 has been in the current deep sleep is at least the pre-determined minimum time duration for deep sleeps, the method proceeds to step 708. As set out above, at step 708, the mobile communications device 30 communicates the alert for the incoming communication.

If the user 10 is in a deep sleep and if the period that the user 10 has been in the current deep sleep is less than the pre-determined minimum time duration for deep sleeps, the method proceeds to step 714.

At step 714, the mobile communications device 30 starts a timer. In this embodiment, the timer is set to expire after the pre-determined minimum time duration for the current deep sleep has elapsed. More specifically, the timer is set for the difference between the pre-determined minimum time duration for deep sleeps and the time that the user has been in the current deep sleep.

After step 714, the method proceeds to step 716. At step 716, the mobile communications device 30 determines whether any one of the following conditions has occurred: (i) the timer set in step 714 expires; (ii) the user 10 is in a light sleep; (iii) the user 10 wakes up; or (iv) an urgent incoming communication is received. If none of the conditions is determined to have occurred at step 716, the method remains at step 716. If any one of these conditions is determined to have occurred at step 716, the method proceeds to step 708. As set out above, at step 708, the mobile communications device 30 communicates the alert for the incoming communication.

Numerous specific details are set forth herein in order to provide a thorough understanding of the exemplary embodiments described herein. However, it will be understood by those of ordinary skill in the art that these embodiments may be practiced without these specific details. In other instances, well-known methods, procedures and components have not been described in detail so as not to obscure the description of the embodiments. Furthermore, this description is not to be considered as limiting the scope of these embodiments in any way, but rather as merely describing the implementation of these various embodiments.

The invention claimed is:

1. A method for managing alerts of a mobile communications device, the method comprising:
   a) using a sensor to monitor activity of a user of the mobile communications device and generate sensor data indicative of the activity;
   b) processing the sensor data to determine a current activity of the user, the current activity being indicative of whether the user can be notified;
   c) detecting an alert corresponding to an incoming communication from a wireless network to the mobile communications device;
   d) classifying the alert as being immediate or deferred based at least in part on the current activity; and
   e) if the alert is immediate, announcing the alert without delay;
   f) otherwise, announcing the alert after a delay, the delay terminating when at least one of a holdback timer expires and the current activity changes to an activity that indicates that the user can be notified, the announcing the alert after the delay comprising:
  i. determining whether the holdback timer is in progress;
  ii. if the holdback timer is not in progress, initializing the holdback timer based upon the current activity;
  iii. storing, in memory, the alert as a pending alert with a corresponding announcement indicator indicating that the alert has not been announced;
  iv. detecting that the delay has terminated; and
  v. announcing one or more pending alerts stored in the memory.

2. The method of claim 1 further comprising:
  a) providing the sensor on a wearable device, the wearable device being equipped with wireless communication; and
  b) wherein at least one of the sensor data and the current activity are transmitted to the mobile communications device and received from the wearable device via the wireless communication.

3. The method of claim 1, wherein the sensor comprises at least one of an accelerometer, a light sensor, and a global positioning system (GPS) receiver.

4. The method of claim 1, wherein the initializing the holdback timer based upon the current activity comprises:
  a) determining a minimum time duration corresponding to the current activity;
  b) determining a time elapsed in the current activity;
  c) determining whether the minimum time duration is greater than the time elapsed; and
  d) if the minimum time duration is greater, initializing the holdback timer to expire upon the difference between the minimum time duration and the time elapsed.

5. The method of claim 1, wherein the storing, in memory, the alert as a pending alert further comprises providing notice that the incoming communication is being managed, the notice being provided via the wireless network to a communications device from which the incoming communication originates.

6. The method of claim 1, wherein the classifying the alert as being immediate or deferred based at least in part on the current activity comprises:
  a) if the current activity indicates that the user can be notified, classifying the alert as being immediate;
  b) otherwise, classifying the alert as being deferred.

7. The method of claim 1, wherein:
  a) the current activity being indicative of whether the user can be notified is based on a type of communication for the incoming communication, the type of communication comprising one of voice-based communications and text-based communications, wherein text-based communications comprises email, text messages, multi-media messages, and instant messaging; and
  b) the classifying the alert as being immediate or deferred based at least in part on the current activity further comprises determining a type of communication for the incoming communication.

8. A method for managing alerts of a mobile communications device, the method comprising:
  a) using a sensor to monitor activity of a user of the mobile communications device and generate sensor data indicative of the activity;
  b) processing the sensor data to determine a current activity of the user, the current activity being indicative of whether the user can be notified;
  c) detecting an alert corresponding to an incoming communication from a wireless network to the mobile communications device;
  d) classifying the alert as being immediate or deferred based at least in part on the current activity; and
  e) if the alert is immediate, announcing the alert without delay;
  f) otherwise, announcing the alert after a delay, the delay terminating when at least one of a holdback timer expires and the current activity changes to an activity that indicates that the user can be notified,
  g) wherein the classifying the alert as being immediate or deferred based at least in part on the current activity further comprises:
    i. determining whether the incoming communication is urgent or not urgent; and
    ii. if the incoming communication is urgent, classifying the alert as being immediate irrespective of the current activity;
    iii. if the incoming communication is not urgent and the current activity indicates that the user can be notified, classifying the alert as being immediate;
    iv. otherwise, classifying the alert as being deferred; and
  h) wherein the determining whether the incoming communication is urgent or not urgent comprises:
    i. determining an originating phone number from which the incoming communication originates;
    ii. accessing a database to determine whether the originating phone number corresponds an urgent originating phone number; and
    iii. if the originating phone number corresponds to an urgent originating phone number, determining that the incoming communication is urgent;
    iv. otherwise, determining that the incoming communication is not urgent.

9. The method of claim 8, wherein the determining whether the incoming communication is urgent or not urgent comprises:
  a) detecting an urgent indicator corresponding to the alert; and
  b) determining that the incoming communication is urgent.

10. A method for managing alerts of a mobile communications device, the method comprising:
  a) using a sensor to monitor activity of a user of the mobile communications device and generate sensor data indicative of the activity;
  b) processing the sensor data to determine a current activity of the user, the current activity being indicative of whether the user can be notified;
  c) detecting an alert corresponding to an incoming communication from a wireless network to the mobile communications device;
  d) classifying the alert as being immediate or deferred based at least in part on the current activity; and
  e) if the alert is immediate, announcing the alert without delay;
  f) otherwise, announcing the alert after a delay, the delay terminating when at least one of a holdback timer expires and the current activity changes to an activity that indicates that the user can be notified,
  g) wherein the classifying the alert as being immediate or deferred based at least in part on the current activity further comprises:
    i. determining whether the incoming communication is urgent or not urgent; and ii. if the incoming communication is urgent, classifying the alert as being immediate irrespective of the current activity;
iii. if the incoming communication is not urgent and the current activity indicates that the user can be notified, classifying the alert as being immediate;
iv. otherwise, classifying the alert as being deferred; and
h) wherein the determining whether the incoming communication is urgent or not urgent comprises:
i. determining an originating phone number from which the incoming communication originates;
ii. accessing a database to determine whether the originating phone number corresponds to an originating phone number for the one or more pending alerts; and
iii. if the originating phone number corresponds to an originating phone number for the one or more pending alerts:
A. determining a total of the one or more pending alerts and the incoming communication having a same originating phone number; and
B. if the total exceeds a threshold number, determining that the incoming communication is urgent;
C. otherwise, determining that the incoming communication is not urgent;
iv. otherwise, determining that the incoming communication is not urgent.

11. A system for managing alerts of a mobile communications device, the system comprising:
a) a mobile communications device, the mobile communications device comprising a wireless communication subsystem for communicating over a wireless network;
b) a sensor for monitoring activity of a user of the mobile communications device and generating sensor data indicative of the activity; and
c) a processor configured for:
i. processing the sensor data to determine a current activity of the user, the current activity being indicative of whether the user can be notified;
ii. detecting an alert corresponding to an incoming communication from a wireless network to the mobile communications device;
iii. classifying the alert as being immediate or deferred based at least in part on the current activity; and
iv. if the alert is immediate, announcing the alert without delay;
v. otherwise, announcing the alert after a delay, the delay terminating when at least one of a holdback timer expires and the current activity changes to an activity that indicates that the user can be notified,
d) wherein the announcing the alert after a delay comprises:
i. determining whether the holdback timer is in progress;
ii. if the holdback timer is not in progress, initializing the holdback timer based upon the current activity;
iii. storing, in memory, the alert as a pending alert with a corresponding announcement indicator indicating that the alert has not been announced;
iv. detecting that the delay has terminated; and
v. announcing one or more pending alerts stored in the memory.

12. The system of claim 11, wherein the sensor is provided on the mobile communications device.

13. The system of claim 11, further comprising:
a) a wearable device, the wearable device comprising a wireless communication subsystem;
b) wherein:
i. the sensor is provided on the wearable device;
ii. the wearable device transmits at least one of the sensor data and the current activity to the mobile communications device via the wireless communication subsystem of the wearable device; and
iii. the mobile communications device receives at least one of the sensor data and the current activity from the wearable device via the wireless communication subsystem of the mobile communications device.

14. The system of claim 11, wherein the sensor comprises at least one of an accelerometer, a light sensor, and a global positioning system (GPS) receiver.

15. The system of claim 11, wherein the processor is provided on the mobile communications device.

16. The system of claim 11, wherein the initializing the holdback timer based upon the current activity comprises:
a) determining a minimum time duration corresponding to the current activity;
b) determining a time elapsed in the current activity;
c) determining whether the minimum time duration is greater than the time elapsed; and
d) if the minimum time duration is greater, initializing the holdback timer to expire upon the difference between the minimum time duration and the time elapsed.

17. The system of claim 11, wherein the storing, in memory, the alert as a pending alert further comprises providing notice that the incoming communication is being managed, the notice being provided via the wireless network to a communications device from which the incoming communication originates.

18. The system of claim 11, wherein classifying the alert as being immediate or deferred based at least in part on the current activity comprises:
a) if the current activity indicates that the user can be notified, classifying the alert as being immediate;
b) otherwise, classifying the alert as being deferred.

19. The system of claim 11, wherein:
(a) the current activity being indicative of whether the user can be notified is based on a type of communication for the incoming communication, the type of communication comprising one of voice-based communications and text-based communications, wherein text-based communications comprises email, text messages, multi-media messages, and instant messaging; and
(b) the classifying the alert as being immediate or deferred based at least in part on the current activity further comprises determining a type of communication for the incoming communication.

20. A system for managing alerts of a mobile communications device, the system comprising:
a) a mobile communications device, the mobile communications device comprising a wireless communication subsystem for communicating over a wireless network;
b) a sensor for monitoring activity of a user of the mobile communications device and generating sensor data indicative of the activity; and
c) a processor configured for:
i. processing the sensor data to determine a current activity of the user, the current activity being indicative of whether the user can be notified;
ii. detecting an alert corresponding to an incoming communication from a wireless network to the mobile communications device;

iii. classifying the alert as being immediate or deferred based at least in part on the current activity; and
iv. if the alert is immediate, announcing the alert without delay;
v. otherwise, announcing the alert after a delay, the delay terminating when at least one of a holdback timer expires and the current activity changes to an activity that indicates that the user can be notified,
d) wherein the classifying the alert as being immediate or deferred based at least in part on the current activity further comprises:
i. determining whether the incoming communication is urgent or not urgent; and
ii. if the incoming communication is urgent, classifying the alert as being immediate irrespective of the current activity;
iii. if the incoming communication is not urgent and the current activity indicates that the user can be notified, classifying the alert as being immediate;
iv. otherwise, classifying the alert as being deferred; and
e) wherein the determining whether the incoming communication is urgent or not urgent comprises:
i. determining an originating phone number from which the incoming communication originates;
ii. accessing a database to determine whether the originating phone number corresponds an urgent originating phone number; and
iii. if the originating phone number corresponds to an urgent originating phone number, determining that the incoming communication is urgent;
iv. otherwise, determining that the incoming communication is not urgent.

21. The system of claim 20, wherein the determining whether the incoming communication is urgent or not urgent comprises:
a) detecting an urgent indicator corresponding to the alert; and
b) determining that the incoming communication is urgent.

22. A system for managing alerts of a mobile communications device, the system comprising:
a) a mobile communications device, the mobile communications device comprising a wireless communication subsystem for communicating over a wireless network;
b) a sensor for monitoring activity of a user of the mobile communications device and generating sensor data indicative of the activity; and
c) a processor configured for:
i. processing the sensor data to determine a current activity of the user, the current activity being indicative of whether the user can be notified;
ii. detecting an alert corresponding to an incoming communication from a wireless network to the mobile communications device;
iii. classifying the alert as being immediate or deferred based at least in part on the current activity; and
iv. if the alert is immediate, announcing the alert without delay;
v. otherwise, announcing the alert after a delay, the delay terminating when at least one of a holdback timer expires and the current activity changes to an activity that indicates that the user can be notified,
d) wherein the classifying the alert as being immediate or deferred based at least in part on the current activity further comprises:
i. determining whether the incoming communication is urgent or not urgent; and
ii. if the incoming communication is urgent, classifying the alert as being immediate irrespective of the current activity;
iii. if the incoming communication is not urgent and the current activity indicates that the user can be notified, classifying the alert as being immediate;
iv. otherwise, classifying the alert as being deferred; and
e) wherein the determining whether the incoming communication is urgent or not urgent comprises:
i. determining an originating phone number from which the incoming communication originates;
ii. accessing a database to determine whether the originating phone number corresponds to an originating phone number for the one or more pending alerts; and
iii. if the originating phone number corresponds to an originating phone number for the one or more pending alerts:
A. determining a total of the one or more pending alerts and the incoming communication having a same originating phone number; and
B. if the total exceeds a threshold number, determining that the incoming communication is urgent;
C. otherwise, determining that the incoming communication is not urgent;
iv. otherwise, determining that the incoming communication is not urgent.

* * * * *